United States Patent [19]
Willen

[11] 3,750,498
[45] Aug. 7, 1973

[54] TOOL HOLDERS FOR MACHINE TOOLS

[75] Inventor: Charles Willen, Villeneuve, Switzerland

[73] Assignee: Charles Willen & Cie, Villeneuve, Switzerland

[22] Filed: Aug. 27, 1970

[21] Appl. No.: 67,370

[30] Foreign Application Priority Data
Aug. 29, 1969 Switzerland.................. 13108/69
Aug. 29, 1969 Switzerland.................. 13109/69
Aug. 29, 1969 Switzerland.................. 13110/69
Aug. 29, 1969 Switzerland.................. 13112/69

[52] U.S. Cl................. 82/36 R, 82/35, 279/1 S, 408/16, 408/146, 29/57
[51] Int. Cl............................................. B23b 29/26
[58] Field of Search .................. 29/57; 82/35, 36 A, 82/36, 37; 408/16, 146; 279/1 S

[56] References Cited
UNITED STATES PATENTS

| | | | |
|---|---|---|---|
| 2,314,314 | 3/1943 | Wettig ................................... | 29/57 |
| 2,456,140 | 12/1948 | Mueller et al. ......................... | 29/57 |
| 2,257,503 | 9/1941 | Lange et al. ......................... | 29/57 X |
| 2,403,405 | 7/1946 | Sirola................................. | 82/36 A |
| 3,471,912 | 10/1969 | Johnson................................. | 29/57 |
| 2,311,211 | 2/1943 | Class................................. | 29/57 X |
| 3,052,999 | 9/1962 | Sedgwick et al..................... | 279/1 S |
| 2,470,218 | 5/1949 | McNamara......................... | 279/1 S |

*Primary Examiner*—Leonidas Vlachos
*Attorney*—Robert E. Burns and Emmanuel J. Lobato

[57] ABSTRACT

A tool holder for machine tools, such as automatic lathes, includes a body for attachment to the turret of the lathe. A tool support is connected to the body and adjusting means is attached to the tool support for adjusting the position of the tool support relative to the body. The adjusting means includes two relatively rotatable parts and roller means between the parts.

9 Claims, 16 Drawing Figures

FIG.4
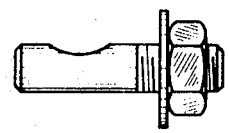
FIG.5
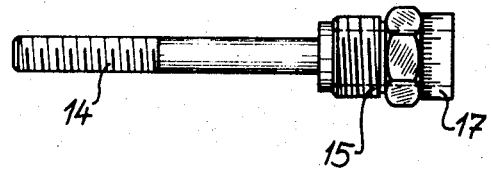
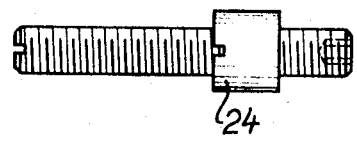
FIG.6
Inventor:

Patented Aug. 7, 1973  3,750,498

Inventor:

Patented Aug. 7, 1973  3,750,498

Inventor:

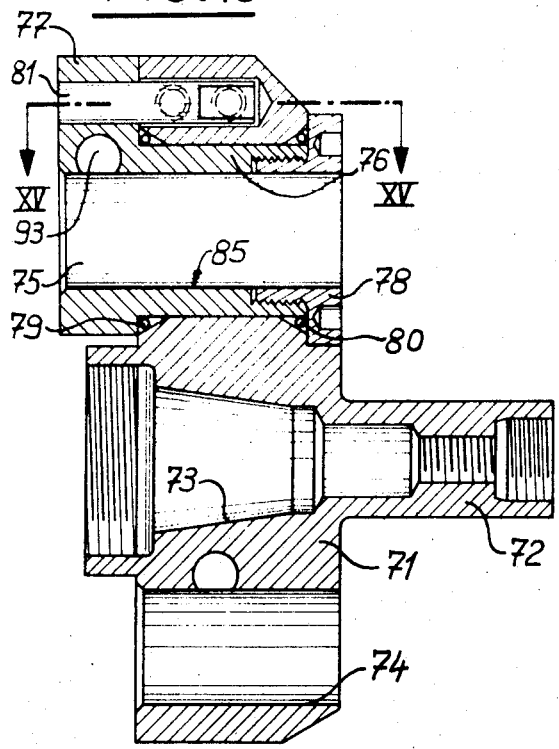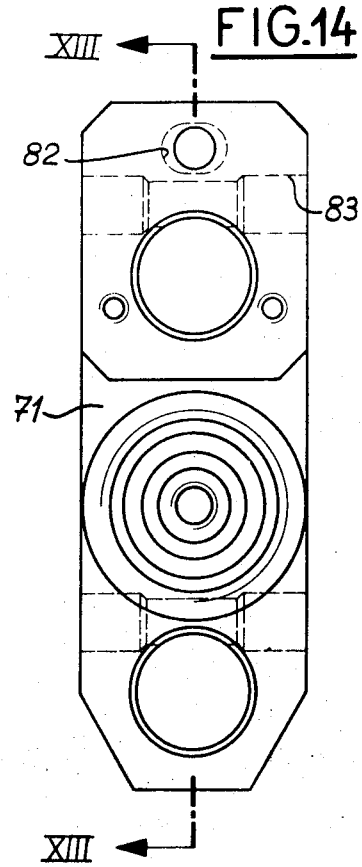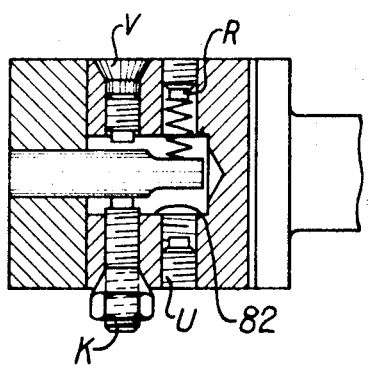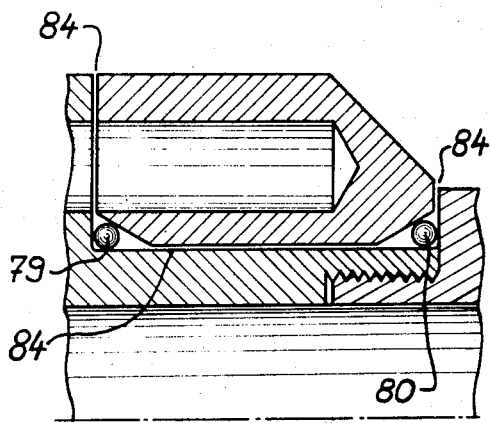

TOOL HOLDERS FOR MACHINE TOOLS

BACKGROUND OF THE INVENTION.

The present invention relates to tool holders for machine tools and in particular to tool holders for automatic, semi-automatic, capstan and turret lathes.

Tool holders are known which include tool supports for supporting cutting tools, the tool supports being adjustable in order to position the cutting edge of their respective tool accurately with respect to a workpiece held in the lathe. The means for adjusting the tool supports are often very bulky and limit the space around the tool and consequently access to the tool is limited. Further, with the known tool holders, the means for adjusting the tool supports are limited to only one tool on a turret.

AIMS OF THE PRESENT INVENTION.

An object of the present invention is the provision of a tool holder having a tool support, and means for adjusting the tool support, which adjusting means is easy to manufacture and compact thereby permitting easy access to a cutting tool held by the tool support.

A further object of the present invention is the provision of a tool holder having a tool support, and means for adjusting the tool support, the adjusting means including relatively rotatable parts and roller means between the parts for eliminating or substantially reducing play between the parts without increasing the frictional resistance between the parts.

According to the present invention, a tool holder for machine tools comprises a body having means on one face for attaching the body to a turret of the machine tool, a tool support releasably attached to the opposite face of the body and micrometric adjusting means attached to the tool support for adjusting the position of the tool support relative to the body, the micrometric adjusting means including first and second parts, the first part being rotatable relative to the second part and roller means between the first and second parts, the roller means being constrained to move along a predetermined path by a race defined by the first and second parts.

Preferably, the micrometric adjusting means adjusts the position of the tool support in an axial direction relative to the body, the micrometric adjusting means including a tubular shaft attached to the body and having at the end remote from the body an external thread which cooperates with the internal thread of a sleeve mounted on the shaft, means carrying indicia mounted for rotary movement with the sleeve and a support flange for supporting means, the axial position of which means, it is desired to adjust, the support flange being mounted on the sleeve by the roller means.

Alternatively, the micrometric adjusting means adjusts the position of the tool support in a transverse direction relative to the body, the micrometric adjusting means including a support member having a bearing part, a cavity and means for attaching the support member to the body, a slide for supporting means, the transverse position of which means it is desired to adjust, the slide being mounted for sliding movement on the bearing part, a nut rigidly attached to the slide and contained within the cavity, and a rotatable leadscrew cooperating with the nut, for transversely displacing the nut within the limits of the cavity, the leadscrew being mounted on the support member by the roller means.

An automatic tool release device may be provided, the release device comprising a tubular sleeve pivotably mounted about its axis in a hole of the body and adapted to support the tool support, and a nut attached to and concentric with the sleeve for pivotal movement therewith, two ball bearings on which the pivoting movement of the sleeve is made, the ball bearings being subject to a stress exerted by operational use of a tool when mounted on the tool support, the play between opposed surfaces of the body and the pivoting sleeve being calculated in such a way as to protect the balls from overload.

DESCRIPTION OF THE FIGURES.

Embodiments of the present invention will now be described, by way of example, with reference to the Figures of the accompanying drawings in which:

FIG. 4 is a side view of a variation of a locking rod;

FIG. 5 is a side view of an axial adjusting device for the tool holder of FIG. 1 or FIG. 3;

FIG. 6 is a side view of an interior adjustable stop accessible from the front of the tool holder of FIG. 1 or FIG. 3;

FIG. 13 is a cross-section according to XIII—XIII of FIG. 14;

FIG. 14 is an outline of the automatic tool release device;

FIG. 15 is a plan cross-section, according to xv—XV of FIG. 13; and

FIG. 16 is a detail of FIG. 13.

DESCRIPTION OF PREFERRED EMBODIMENTS.

Figure 1:
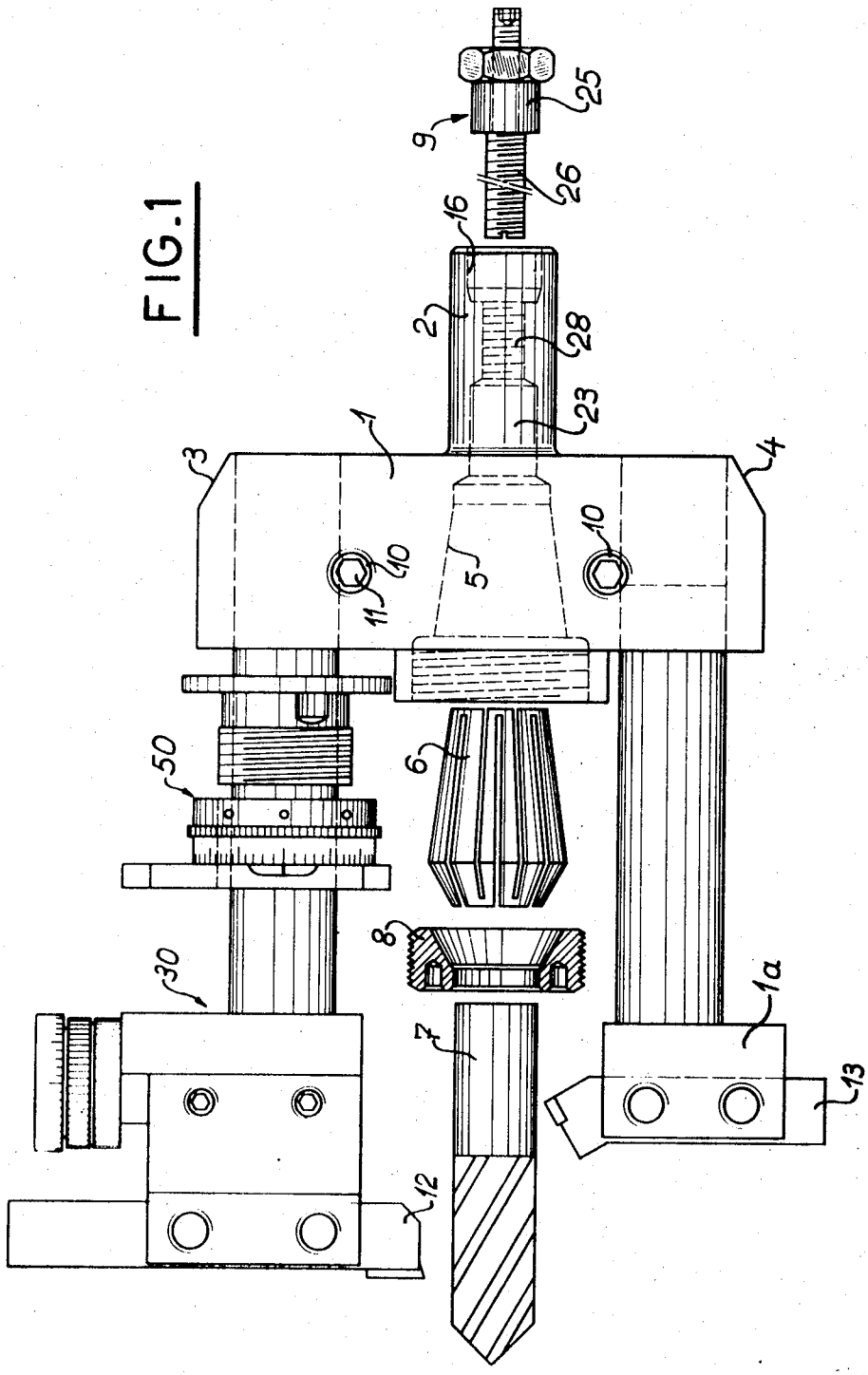
FIG. 1 is a side view of a first embodiment of a tool holder.

As shown in FIG. 1, a tool holder assembly comprises a tool holder body 1 having a hollow central shank 2 on one face. The shank 2 is adapted for attaching the body 1 to the turret (not shown) of an automatic, semi-automatic, turret or capstan lathe. Chamfers 3 and 4 are formed on the body 1 to enable other tool holders to be mounted on adjacent surfaces of the turret. A central through hole is formed in the body 1 and the hole includes a tapered portion 5 which receives a tapered collet 6. As seen in FIG. 1, the collet comprises a hollow sleeve having therein numerous slots which render the sleeve radially compressible thereby enabling the sleeve to be compressed and tightened over the shank of a work tool. The collet 6 receives the shank of work tool such as a drill 7 and is both tightened down on the shank of the drill 7 and connected to the tool holder body by connecting means comprising a nut 8 engaging in a threaded boss co-axial with the central through hole. An internal surface of the nut 8 is tapered and cooperates with an externally tapered surface of the collet 6 to clamp collet 6 against the shank of drill 7. The hollow interior of shank 2 is threaded at 28 and receives a threaded rod 26 which forms part of an adjustable stop mechanism 9 for the drill 7 which stop mechanism 9 is accessible from the rear of the tool holder. Mounted on rod 26 is a lock nut 25 partially received in a recess 16 at the end of the shank 2. The adjustable stop mechanism comprises a variable settable limiting means for limiting the depth of insertion of the work took into the tool holder assembly.

Alternatively, a lock nut 24 (see FIG. 6) can replace lock nut 25, which lock nut 24 is received within a recess 23 of shank 2 and is accessible from the front of the tool holder.

The rod 26 is provided at one end with a screwdriver slot and at the opposite end with an hexagonal recess for an Allan key.

To adjust the rod 26 of stop mechanism 9, the lock nut 24, 25 is released and the rod 26 rotated to move it axially along the shank 2. The pitch distance between adjacent threads of the rod 26 is such that one turn of the rod 26 displaces the rod 26 axially by 1 mm.

An axially movable micrometric adjustment device enables the precise adjustment of a boring tool support engaged within the tapered portion 5 of the central through hole. The device is positioned within the hollow interior of shank 2 and includes, as seen in FIG. 5, a partially threaded rod 14, the threaded end of which engages within a threaded hole in the boring tool support (not shown) and the opposite end of which has a circular collar defining a shoulder which engages a bearing surface made in the shank 2 of the tool holder. A graduated ring is force fitted on to the rod 14 and a lock nut 15 is partially received in recess 16.

Figure 2:
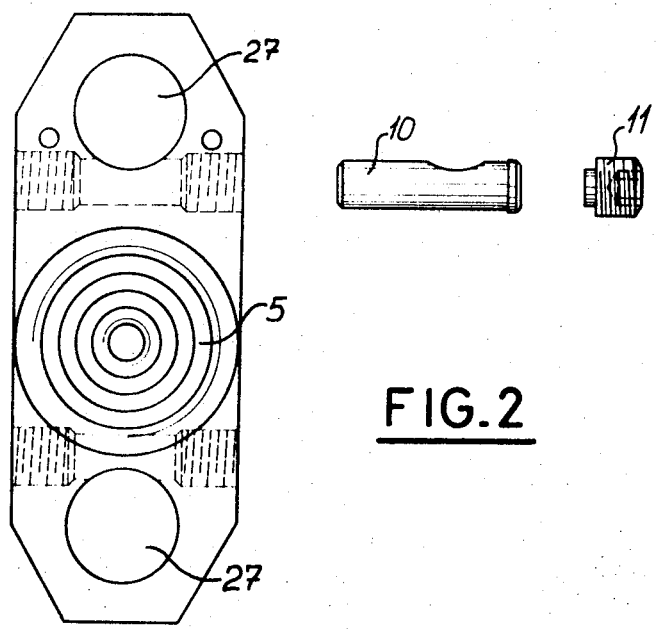
FIG. 2 is a partially exploded front view of the body of the tool holder shown in FIG. 1.

The body 1 of the tool holder has on opposite sides of the central through hole two further holes 27 (FIG. 2) each intended to receive a tool support. As shown in FIG. 1, a turning tool 13 is attached to the body 1 of the tool holder by means of a simple tool support 1a. Another turning tool 12 is attached to the body 1 by a tool support which incorporates a radial micrometric adjusting device 30 and an axial micrometric adjusting device 50, the functioning of which will be described later.

The tool supports are locked, once in place in the body 1, by locking means comprising movable locking rods 10. Each rod 10 can be held in position by a hexagonal headless screw 11 (FIG. 1) or the locking rod 10 can be drawn by a nut engaged on a thread on the rod. With these two arrangements, the locking rods 10 are not liable to fall when there are no tool supports mounted in the corresponding holes 27. In addition, the rods 10 are interchangeable and usable in the body 1 of the tool holder.

Figure 3:
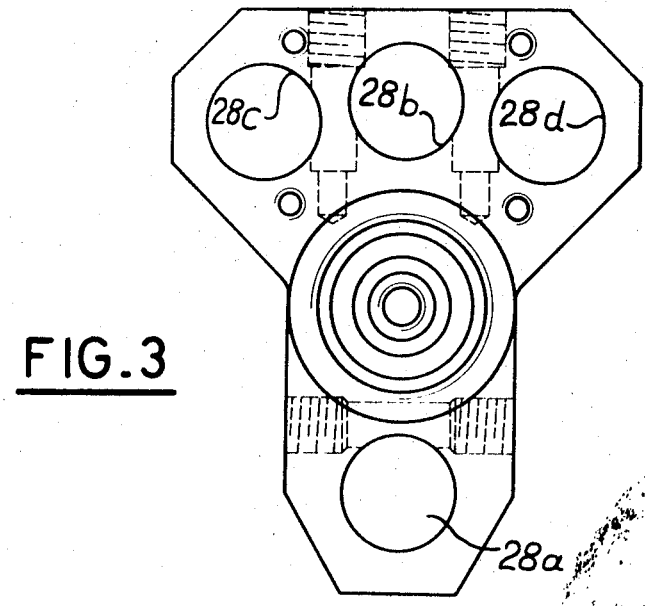
FIG. 3 is a front view of a second embodiment of a body of a tool holder.

In FIG. 3, a different embodiment of a tool holder is shown, which includes a central through hole with associated collet, nut and threaded boss for a centrally held tool and, holes 28a, 28b, 28c and 28d for receiving tool supports. The relative arrangement of the holes 28b, 28c and 28d is such as to permit the utilization of the same locking rod for one or the other of the adjacent holes. It is possible, either to attach only one tool support in the hole 28b and to lock it by one of the two adjacent rods, or to attach a tool support in each of the holes 28c and 28d and to lock them by the rods by turning these 180° in their housings. The tool supports are fitted with micrometric adjustment devices which have been referred to earlier. The micrometric adjustment devices are small and compact so that they do not occupy excessively large amounts of space and permit easy access to the various cutting tools.

Figure 7:
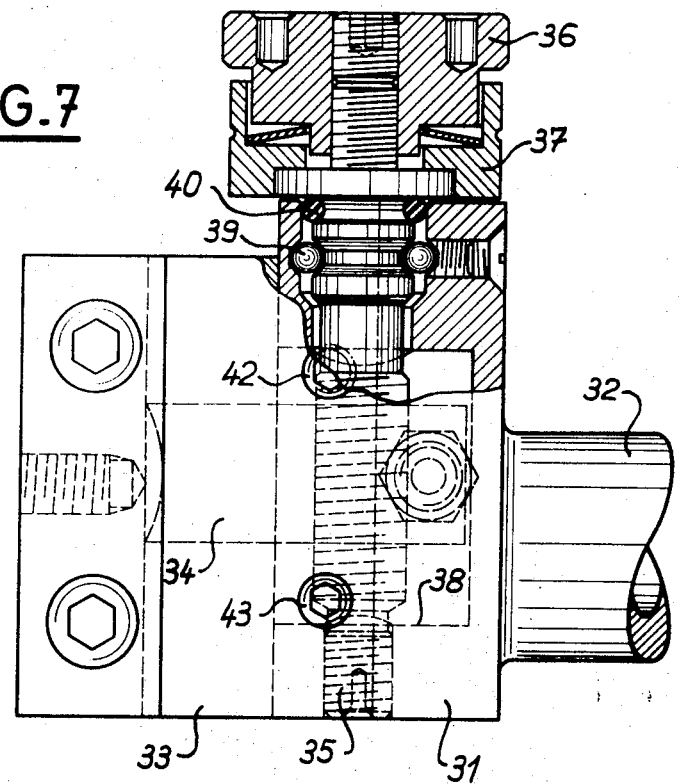
FIG. 7 is a partial sectional view of a radial micrometric adjusting device.
Figure 8:
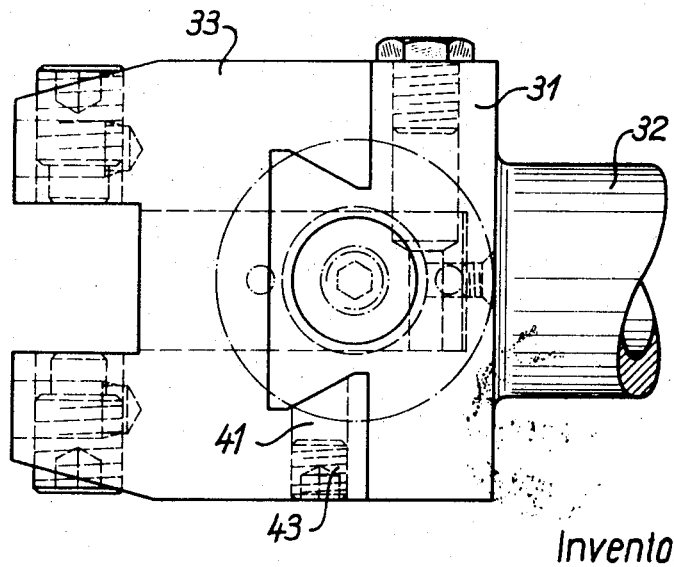
FIG. 8 is a plan view of the device shown in FIG. 7.

As shown in FIGS. 7 and 8, a radial micrometric adjustment device comprises a fixed support member 31 having on one side a tenon-like bearing part, on the opposite side a shaft 32 for connecting the radial micrometric adjustment device to an axial micrometric adjustment device, as shown in FIG. 1 and a cavity 38. A slide 33 is mounted for sliding movement on the bearing part and has a recess formed therein for supporting a cutting tool (not shown). A nut 34 rigidly attached to the slide 33 is contained within cavity 38 and engages a leadscrew 35. The leadscrew 35 is mounted in support member 31 by means of ball bearings 39 and extends outwardly from support member 31 to rigidly engage a gear 36. A graduated ring 37 surrounds the screw and a sealing ring 40 protects the ball bearings 39 from the ingress of foreign matter.

Rotation of gear 36 causes leadscrew 35 to rotate which in turn, causes nut 34 and slide 33 to move axially of the leadscrew within the limits of cavity 38. The ball bearings 39 are in contact with their bearing race theoretically at four points, made according to four sections of the spherical surface. They are submitted to a stress exerted by their race. This constraint is calculated in such a way, that all radial and/or axial play of leadscrew 35 is eliminated and the resisting couple opposing the rotation of the leadscrew is kept to a minimum.

The use of ball bearings enables the use of all positioning stops for leadscrew 35 to be omitted, thereby permitting the size of the adjustment device to be kept to a minimum.

Furthermore, in order to avoid play between the leadscrew 35 and the nut 34, the nut 34 has, at its extremity, a slot opening out into the threaded housing of screw 35. A screw, not shown, acts on the extremity of the nut in such a way as to alter the diameter of the threaded housing.

The slide 33 can be locked in a predetermined position on the bearing part by a gib 41 which is tightened on to the bearing part of support member 31 by locking screws 42 and 43.

Figure 9:
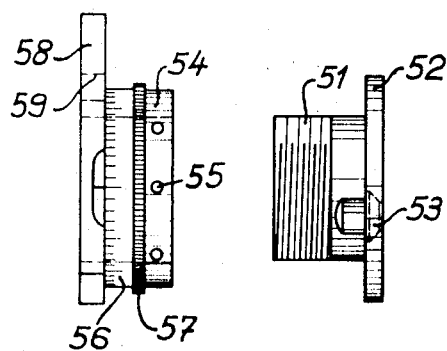
FIG. 9 is a side view of an axial micrometric adjusting device.
Figure 10:
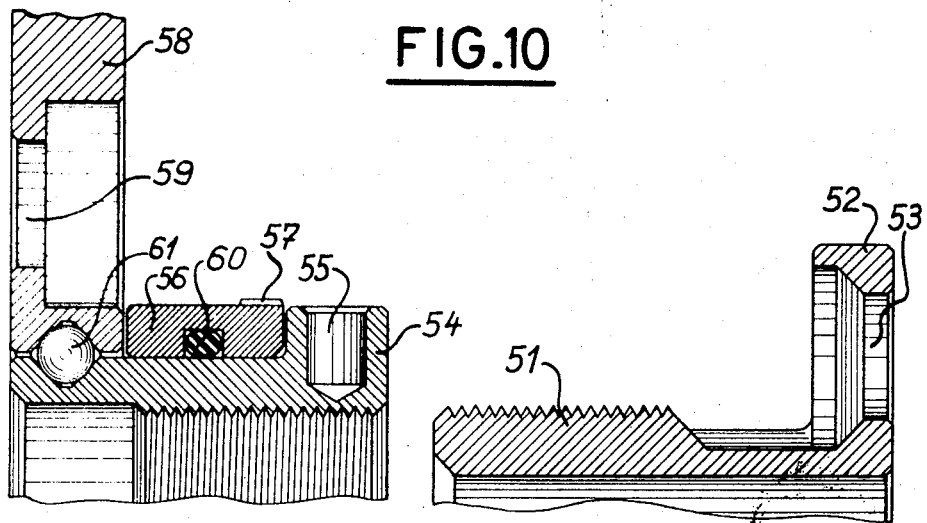
FIG. 10 is a partial cross-section of the device shown in FIG. 9.

As shown in FIGS. 9 and 10 an axial micrometric adjustment device comprises a tubular shaft 51, threaded at one end, with a flange 52 at the opposite end. Fastening holes 53 are formed in the flange 52 for attaching the shaft 51 to the body 1 of the tool holder. An internally threaded sleeve 54 engages with the threaded end of shaft 51 and is screwable on the threaded end by a handle (not shown), the end of which is reducing blind holes 55, formed in the periphery of an end flange. A graduated ring 56, one part 57 of which is knurled, is mounted on the sleeve 54. A washer 60 is arranged between the sleeve 54 and the ring 56 to ensure friction between the two parts so that they rotate together. A support flange 58 is mounted on the left-hand end of sleeve 54, as seen in FIG. 10, by ball bearings 61. A hole 59 in the support flange 58 is intended to enable the fixing of the tool, the axial position of which it is required to adjust.

The ball bearings 61 are in contact with their moving bars, theoretically at four points, in practice according to four parts of the spherical surface. The race or bearing path exerts a force on the balls 61 which is caluclated, in such a way, as to only bring about a slight springy deformation of the ball and the ball race.

Owing to the use of such a ball bearing, sleeve 54 has no play either in the axial direction or in the radial direction. Furthermore, this bearing enables the micrometric adjusting device to be manufactured with very small dimensions and which device can be used, for example, on an automatic lathe without causing problems of space.

This device can act, for example, for the adjustment of the position of a tool provided with fixing shank housed in the body 1 of the tool holder and locked in the working position.

The tubular shaft 51 is fixed to the body 1 of the tool holder by means of the flange 52, and the support flange 58 is fixed to the tool or tool support, the attaching shank of which passes through the central bores of the sleeve and shaft of the device and penetrates into the body 1 of the tool holder where it is locked in the usual manner, after the axial position has been adjusted by screwing sleeve 54 on the shaft 51.

When it is desired to adjust the position of a tool the zero of the graduated ring is brought opposite a fixed datum mark. The shank of the tool is then loosened in the inside of the body 1 of the tool holder, then the sleeve 54 is screwed to the desired position which is shown on the graduated ring 56. The shank of the tool is then locked in the body 1 of the tool holder.

Figure 11:
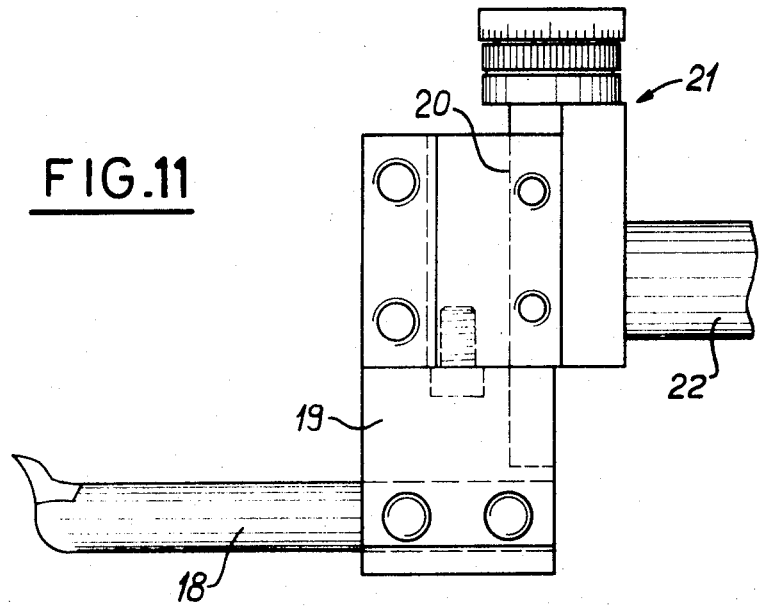
FIG. 11 is a side view of a boring tool.
Figure 12:
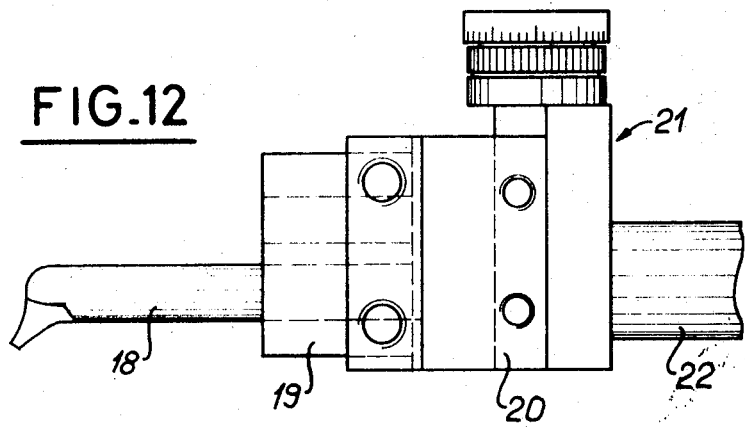
FIG. 12 is a side view of another variation of a boring tool.

FIGS. 11 and 12 show a detachable element of the tool holder which consists of a tool 18, in this case, a boring cutter, mounted on a body 19 held rigid by two screws in a slide 20 of a radial micrometric adjusting device 21. The shank 22 can be fixed directly in one of the holes 27, or 28a, 28b, 28c, 28d of the body 1 of the tool holder or still combined with an axial micrometric adjusting device, the latter being engaged in one of the holes 27, 28a, 28b, 28c or 28d.

This detachable element of the tool holder enables the interior of a workpiece to be machined by using micrometric adjusting means. It is obviously possible to simultaneously machine the inside and the outside of the said workpiece by using other tools fixed in other holes in the body 1 of the tool holder.

It is possible to fit an automatic tool release device (not shown) on the body 1 of the tool holder.

For this purpose, the body 71 of the tool holder (FIG. 13) comprises, a hollow shank 72, a central through hole with a tapered portion 73 for housing a conical collet (not shown) and, two holes 74 and 85. Hole 74 is of a known type but hole 85 has a slightly enlarged diameter and receives a tubular sleeve 76 having an internal surface 75, which, as with hole 74, is intended to receive the shank of a detachable tool support. The sleeve 76 comprises a flange bearing 77 which is pressed against a surface of the tool holder, and a threaded end on which is screwed a nut 78. The sleeve and nut assembly rotates on two ball bearings 79 and 80 which are placed in two cavities each having a straight triangular section as seen in FIG. 13. For bearing 79, the three surfaces of the race or cavity are defined, on one side by a chamfer made in the body 1 of the tool holder, and on the other side, by two faces of nut 76 arranged at right angles to each other. The three surfaces of the ball bearing cavity or race of balls 80 are constituted on one side, by a chamfer made in the body 1 of the tool holder, and on the other side by two faces at right angles on, respectively, the sleeve 76 and nut 78.

The balls are in contact with their race, theoretically at three points, in practice on three sections of the spherical surface. This race exercises a certain stress on the balls when the assembly is in the inoperative position, that is, when the cutting tool is not subject to any force. The constraint exersided on the ball, is determined in such a way, that all radial play and/or axial play of the pivoting element is eliminated, and that the resisting couple opposing the rotation of the assembly, remains, nevertheless, minimum. Furthermore, this mounting on ball bearings prevents the seizing of the assembly, should the shank of the cutter holder engaged in boring 75 be moved, for example, when the cutting tool is submitted to a considerable force.

A slight clearance 84 (FIG. 16) is made between the opposite faces of the pivoting assembly and the body 1 of the tool holder in such a way as to eliminate friction between them during the rotation of the assembly. This clearance acts as a safety device in case of accessive force; in this case it disappears, as the said opposite surfaces can come into contact as a result, protecting the balls against any overload. The distortion of the balls and their race remains in the springy limit of the material, and consequently, avoids any distortion of their contact surface. As soon as the excessive force ceases, the rolling members take up their position and normal functioning.

A pin 81 is driven into the flange bearing 77 and is engaged in a hole having an oblong cross-section 82 made in the body 1 of the tool holder. The clearance of this tool inside the blind hole 82 is limited by a fixed stop V, and by an adjustable stop K. A recall spring R holds the pin against the stop K in the inoperative position, the tool being found then in its free position. Screw U is a blocking screw. It is possible if so desired, to easily change the clearance direction of the tool, by changing screw K and screw V on the one hand, spring R and blocking screw U on the other hand.

Furthermore, screw U is longer than screw K; this enables, if necessary, to compress spring R with more force than with screw K.

Boring 93 is intended to take a locking rod for locking the shank of the tool support which is engaged in the sleeve 76.

In the embodiments which have been described, the use of radial and axial micrometrics adjusting devices multiplies the possibilities of use for automatic and semi-automatic lathes. In fact, it permits the use of several tools, each of which are simultaneously adjustable with extreme accuracy, independently of each other. The miniturization of the adjustment devices, has enabled the use of the maximum number of tools on the same body of the tool holder without posing any problem of space. Furthermore, the tool holder described offers the possibility of a multiple combination in the choice of working tools.

All these advantages enable the user of such a tool holder to limit consecutive production stopping time for the adjustment of the machine or changing tools.

Finally, it should be noted that the body of the tool holder has a shape so designed that it enables one body to be pressed against another body when attached to the turret of a lathe, thus confering a very great rigidity to the whole of the body of the tool holders carried by the same turret.

What is claimed is:

1. A tool holder assembly for releasably holding work tools comprising: a tool holder body; a hollow shank projecting outwardly from said tool holder body for attaching same to a machine turret during use of the tool holder assembly; means defining a through hole extending through said tool holder body in alignment with the hollow interior of said hollow shank and having an axially extending tapered portion; a radially compressible hollow sleeve having an axially extending tapered portion dimensioned to be inserted into said tapered portion of said hollow shank and dimensioned to receive axially therein a shank portion of a work tool; connecting means slidable over an exterior portion of said hollow sleeve for releasably connecting same to said tool holder body and cooperative with said tapered portion of said through hole to effect radial compression of said hollow sleeve to tighten same over the work tool shank thereby releasably and rigidly connecting the work tool to said tool holder body; variably settable limiting means extending into said hollow interior of said hollow shank and engageable with the endmost portion of the work tool shank for variable setting the limit of axial extent of the work tool shank relative to said tool holder body; means defining three other holes disposed in said tool holder body in mutually spaced-apart relationship with respect to each other; a plurality of tool supports having rods slidably insertable into individual ones of said three other holes; and locking means including a pair of reversible locking rods each mounted for reversible angular movement about its axis within said tool holder body at a location between a different two of said three other holes to effect releasable locking of one of said tool supports on said tool holder body in response to angular movement of said locking rod when the tool support is inserted into one of said two holes.

2. A tool holder assembly according to claim 1; wherein said connecting means comprises means defining threads in said tool holder body surrounding said through hole and located adjacent said tapered portion of said through hole, and a nut having threads on the exterior thereof complementing those on said tool holder body and having means therein defining an opening configured to both receive therethrough the work tool shank and to engage with an end portion of said hollow sleeve, whereby said nut may be threaded into said threads to radially compress said hollow sleeve about the work tool shank and connect the work tool to said tool holder body.

3. A tool holder assembly according to claim 1; wherein said variable settable limiting means comprises means defining threads along said hollow interior of said hollow shank, a threaded rod threaded into said hollow shank whereby rotational movement of said rod relative to said hollow shank effects translational movement of said rod along said hollow shank and wherein an end tip of said rod constitutes an abutment surface for the work tool shank.

4. A tool holder assembly according to claim 3; including a lock nut threaded onto said rod for locking said rod in position within said hollow shank.

5. A tool holder assembly according to claim 3; wherein said rod includes means on at least one end tip thereof for releasably engaging with a tool to effect rotation of said rod.

6. A tool holder assembly according to claim 1; including means defining another hole in said tool holder body; another tool support slidably insertable into said another hole; and another locking means including another locking rod mounted for angular movement about its axis within said tool holder body for releasably locking said another tool support on said tool holder body.

7. A tool holder for machine tools comprising: a body having a pair of opposite faces, means including a hollow shank projecting outwardly from one of said faces for attaching said body to a turret of a machine tool, means defining three holes in said body extending from the other of said faces into said body and disposed in mutually spaced-apart and symmetrical relationship, a tool support releasably mounted in at least one of said holes, locking means including two reversible locking rods each mounted for reversible angular movement on said body at a location between a different two of said three holes and cooperative therewith depending upon the direction in which it is angularly moved for releasably locking said tool support on said body, means within said body defining a central through hole having a tapered portion, a tapered collet insertable into said tapered portion of said through hole, a nut engageable with said collet for tightening said collet over the shank of a work tool, and an adjustable stop mechanism disposed within said hollow shank for adjustably setting the position of the work tool relative to said body.

8. A tool holder according to claim 7, wherein said adjustable stop mechanism comprises a threaded rod threaded into said hollow shank and accessible from the front surface or back surface of said body, and a locking nut threaded on said threaded nut.

9. A tool holder according to claim 7, wherein said locking rod is tightened by a nut screwed thereon.

* * * * *